United States Patent [19]

Maddalozzo, Jr. et al.

[11] Patent Number: 6,041,366
[45] Date of Patent: Mar. 21, 2000

[54] SYSTEM AND METHOD FOR DYNAMIC SPECIFICATION OF INPUT/OUTPUT ATTRIBUTES

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 09/019,566

[22] Filed: Feb. 2, 1998

[51] Int. Cl.[7] ................................................. G06F 13/00
[52] U.S. Cl. ........................... 710/5; 710/3; 710/5; 711/4
[58] Field of Search .................................. 710/5, 3, 7, 6, 710/65; 711/4, 114; 714/1, 769

[56] References Cited

U.S. PATENT DOCUMENTS

| | | | |
|---|---|---|---|
| 5,671,385 | 9/1997 | Jost .......................................... | 395/404 |
| 5,740,239 | 4/1998 | Bhagat et al. ........................... | 379/243 |
| 5,740,469 | 4/1998 | Yin et al. ................................ | 395/885 |
| 5,890,014 | 3/1999 | Long ....................................... | 395/828 |
| 5,893,919 | 4/1999 | Sarkozy et al. ......................... | 711/114 |
| 5,918,250 | 6/1999 | Hammond ............................... | 711/207 |
| 5,918,251 | 6/1999 | Yamada et al. ......................... | 711/205 |

FOREIGN PATENT DOCUMENTS

| | | | |
|---|---|---|---|
| 8-137458 | 5/1996 | Japan ............................... | G09G 5/24 |

OTHER PUBLICATIONS

IBM TDB "Automatic Swap of the Primary and Secondary Mirrors in a Disk Mirror System", vol. 36, No. 12, Dec. 1993, pp. 85–86.

IBM TDB, "Selecting Mirrored Disk Unit For Read Operations", vol. 33, No. 4, Sep. 1990, pp. 33–34.

IBM TDB "Improvement of the Mirror Write Consistency Algorithm", vol. 37, No. 02B, Feb. 1994, pp. 255–256.

IBM TDB "Reduction of Delay Experienced during Mirror Disk Access Failures", vol. 36, No. 12, Dec. 1993, pp. 601–602.

*Primary Examiner*—Thomas C. Lee
*Assistant Examiner*—Chun Cao
*Attorney, Agent, or Firm*—Leslie A. Van Leeuwen; Thomas E. Tyson

[57] ABSTRACT

The present invention is a system, method, and computer readable medium for dynamically specifying one or more attributes for an I/O transaction, or group of I/O transactions. There are situations where it is advantageous to allow a process (i.e. user or application) to dynamically change I/O attributes, such as the primary mirror and scheduling type, for a single I/O operation or for groups of I/O operations. The present invention allows a process to request a particular attribute (e.g., a primary mirror or a scheduling type, such as parallel or sequential) or set of attributes for an I/O transaction. If the dynamically requested attribute or attributes are available, they are used to complete the I/O transaction. If any requested attributes are not available, a default attribute or attributes are used, so that the I/O transaction completes. One or more attributes may be dynamically requested, and the dynamically requested attributes may be in effect for a single I/O transaction, for a specified group of I/O transactions, or until the attributes are re-requested. I/O attributes may be dynamically changed while the system is executing, without having to shut down the system or the I/O sub-system.

32 Claims, 3 Drawing Sheets

SYSTEM AND METHOD FOR DYNAMIC SPECIFICATION OF INPUT/OUTPUT ATTRIBUTES

FIELD OF THE INVENTION

The present invention relates to information handling systems, and, more particularly, to a system and method for dynamically selecting attributes for use during I/O operations.

BACKGROUND OF THE INVENTION

In today's data processing environment, it is often desirable to maintain more than one copy of data. Maintaining multiple copies of data increases the availability of the data, and decreases the possibility that data will be lost due to memory failure, disk failure, or other hardware problems.

One method used to maintain multiple copies of data is known as mirroring. Mirroring is a form of RAID (Redundant Array of Independent Disks), and is often referred to as RAID-1. Mirroring is implemented by storing two or more copies of data on two or more different disks. Data may be read from any of the disks on which it is stored, so long as the disk is available.

In a typical information handling system, each fixed-disk drive is referred to as a physical volume, and has a unique name. Each physical volume in use belongs to a volume group. The physical volumes within a volume group are divided into physical partitions of the same size. Within each volume group, one or more logical volumes may be defined. Data on a logical volume appears to be contiguous to a user, but is usually discontiguous on the physical volume. Each logical volume is divided into one or more logical partitions, where each logical partition corresponds to one or more physical partitions. To implement mirroring, additional physical partitions are used to store the additional copies of each logical partition.

Two types of scheduling policies, known as parallel mirroring and sequential mirroring, may be implemented in a mirrored system. In parallel mirroring, a write request is broadcast to all mirrored disks within a logical volume, and data is written to each of the mirrored disks. When a read request is received, the requested data is read from the disk whose disk head is considered physically closest to the address location of the requested data. In sequential mirroring, one mirror (i.e. disk) is designated as the primary mirror, and the remaining mirrors (i.e. disks) are designated as secondary mirrors. When a read request is received in a sequentially mirrored system, the data is read from the primary mirror. When a write request is received, the data is written to the primary mirror first, and then to each of the secondary mirrors.

When a logical volume is defined, a scheduling policy (i.e. the type of mirroring, either parallel or sequential, and the primary mirror if necessary), is defined by a logical volume manager. The scheduling policy can not typically be changed without halting the operation of the logical volume and re-defining the scheduling policy.

It is often undesirable to handle every I/O request using the same scheduling policy. System performance can degrade due to bus and disk contention when every I/O operation from every process (i.e. application) is requesting access to the same primary mirror. Further, for write operations, parallel mirroring is usually more efficient, while sequential mirroring usually insures that an application can determine which mirror contains the latest copy of data in the event of a system crash.

A prior art method for swapping the primary and secondary mirrors in an error situation is discussed in IBM Technical Disclosure Bulletin Vol. 36, No. 12 (December 1993). However, the swap is made based upon an error being detected by the system, and once the swap has been made, the newly designated primary mirror becomes the primary mirror for all users and all I/O requests from that point on. The prior art does not teach or suggest a method for dynamically specifying I/O attributes, such as use of a primary mirror or type of scheduling, for a single I/O request or for a group of I/O requests.

Consequently, it would be desirable to have a system and method for dynamically specifying I/O attributes for a single I/O operation, or for groups of I/O operations. It would also be desirable to be able to dynamically specify a scheduling policy, such as a primary mirror and scheduling type, for all applications without having to halt operation of a logical volume. It would be further desirable to complete an I/O operation using an alternate or default attribute if a dynamically requested I/O attribute is not available.

SUMMARY OF THE INVENTION

Accordingly, the present invention is directed to a system, method, and computer readable medium for dynamically specifying one or more attributes for an I/O transaction, or group of I/O transactions. There are situations where it is advantageous to allow a process (i.e. user or application) to dynamically change I/O attributes, such as the primary mirror and scheduling type, for a single I/O operation or for groups of I/O operations.

The present invention allows a process to dynamically request a particular attribute (e.g., a primary mirror) or set of attributes for an I/O transaction, and, if available, the dynamically requested attribute or attributes are used to complete the I/O transaction. If any dynamically requested attributes are not available, one or more default attributes are used, so that the I/O transaction completes. One or more attributes may be dynamically requested, and the dynamically requested attributes may be in effect for a single I/O transaction, for a specified group of I/O transactions, or until the attributes are dynamically re-requested.

An advantage of the present invention is that I/O attributes may be dynamically changed while the system is executing. A further advantage of the present invention is that an I/O operation will be completed using a default attribute or attributes if the dynamically requested attribute (s) are not available.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
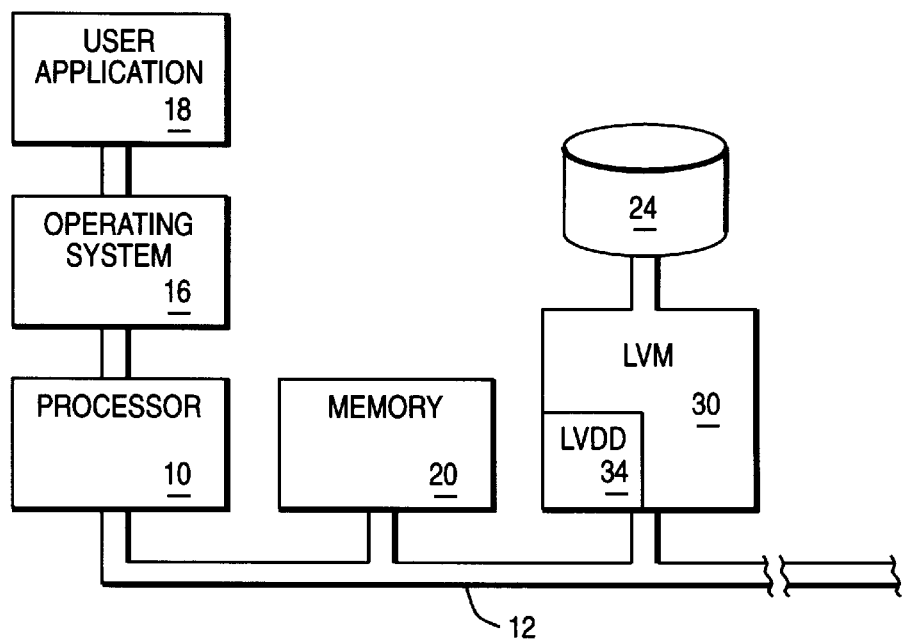
FIG. 1 is a block diagram of an information handling system on which the present invention may be implemented.

The invention may be implemented on a variety of hardware platforms, including personal computers, workstations, mini-computers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one processor 10. Operating system 16 runs on processor 10, providing control and coordinating functions of the various components of the information handling system. One or more user applications 18 may execute in the information handling system. Processor 10 is interconnected via system bus 12 to memory 20, and logical volume manager (LVM) 30. LVM 30 includes logical volume device driver (LVDD) 34, and is connected to disk storage subsystem 24.

As discussed above, in the background of the invention section herein, each individual fixed-disk drive which is part of disk storage subsystem 24 is referred to as a physical volume, and has a unique name. Each physical volume is divided into physical partitions of the same size. A volume group consists of one or more physical volumes, and each physical volume in use belongs to a volume group. Within each volume group, one or more logical volumes are defined. Each logical volume is divided into one or more logical partitions, where each logical partition corresponds to at least one physical partition.

In the described embodiment, LVM 30 controls and manages disk resources by mapping data between the logical view of storage as used by application programs, and the actual physical disks. LVM 30 accomplishes this mapping through the use of LVDD 34, which preferably manages and processes I/O requests. LVDD 34 translates logical addresses from user applications 18 and operating system 16 into physical addresses, and sends I/O requests to specific device drivers.

Figure 2:
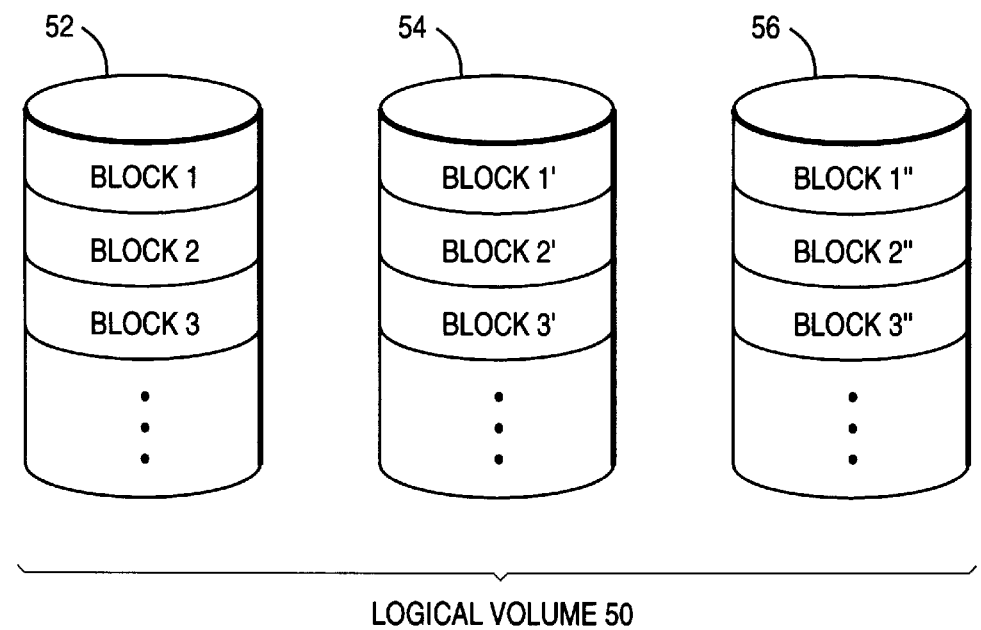
FIG. 2 is a block diagram of a logical volume containing three mirrored disks, on which the present invention may be implemented.

Referring now to FIG. 2, a logical volume containing three mirrored disks will now be described. Logical volume 50 includes physical volumes 52, 54, and 56. Physical volumes 52, 54, and 56 are part of disk storage subsystem 24 (shown in FIG. 1). Physical volumes 52, 54, and 56 are also referred to as mirrors, or mirrored disks. The data stored in logical volume 50 is stored on three different disks, i.e. physical volumes 52, 54, and 56, and is therefore referred to as triply-mirrored. Each block of data is stored on each physical volume, and thus each physical volume contains a complete copy of the data. Although FIG. 2 depicts a triply-mirrored logical volume, the present invention may be implemented in various types of information handling systems where it is desired to dynamically specify I/O attributes.

When a logical volume is defined, a scheduling policy for I/O operations is defined by the LVM. For example, a sequential scheduling policy may be defined with physical volume 52 designated as the primary mirror. In this case, during every read operation to logical volume 50, data is read from physical volume 52. During a write operation, data is first written to physical volume 52, and then to each of physical volumes 54 and 56. Alternately, a parallel scheduling policy may be defined. In this case, during every read operation, data is read from the physical volume whose read head is closest to the desired data. During a write operation, data is broadcast to physical volumes 52, 54, and 56 simultaneously.

Typically, a defined scheduling policy can not be changed without halting operation of the logical volume, and re-defining the scheduling policy. However, there are situations where it is advantageous to allow a process (i.e. user or application) to dynamically change the scheduling policy for a single I/O operation. For example, it could be that many processes are accessing the same database information, Where the information is mirrored on physical volumes 52, 54, and 56 (shown in FIG. 2). Each process could use a different physical volume as the primary mirror for read operations, thus providing load balancing among the physical volumes, and resulting in less disk contention. This is especially useful in a networked system, where both disk contention and bus contention may be reduced by load balancing among the physical volumes. Those skilled in the art will appreciate that there may also be situations where it would be useful to dynamically specify a primary mirror for a particular write operation.

It is also useful to allow a process to dynamically specify whether a sequential or parallel scheduling policy should be used. For example, for some transactions it is important to know which mirror contains the latest data (e.g., in the event of a system or disk failure), and so a sequential scheduling policy is preferable. For other transactions, efficiency is more important, and so a parallel scheduling policy is preferred. A process may dynamically switch between sequential and parallel scheduling policies depending on the I/O transaction being performed.

The present invention is a system, method, and computer-readable medium for dynamically specifying one or more attributes for an I/O transaction, or group of I/O transactions. In the described embodiment, one or more mirroring attributes is specified when an I/O operation is requested. For example, suppose that three mirrors are defined as follows:

```
#define PRIMEMIRROR1 0x100000    /* Use mirror 1 */
#define PRIMEMIRROR2 0x200000    /* Use mirror 2 */
#define PRIMEMIRROR3 0x300000    /* Use mirror 3 */
```

When a read operation is requested, any of the defined mirrors may be used as the dynamically requested primary mirror, as follows:

readx (file_descrip,address,size,PRIMEMIRROR1);

Other mirroring attributes, such as whether a sequential or parallel scheduling policy should be used, may be requested in a similiar manner. Those skilled in the art will appreciate that any combination of I/O attributes may be dynamically specified, and that other methods for dynamically requesting I/O attributes, such as mirroring attributes, may be used. For example, a process may set a variable before requesting an I/O operation, where the variable dynamically sets one or more mirroring attributes. The variable may set mirroring attributes for the next I/O operation, for a group of I/O operations, or for all I/O operations until the variable is reset.

Figure 3:
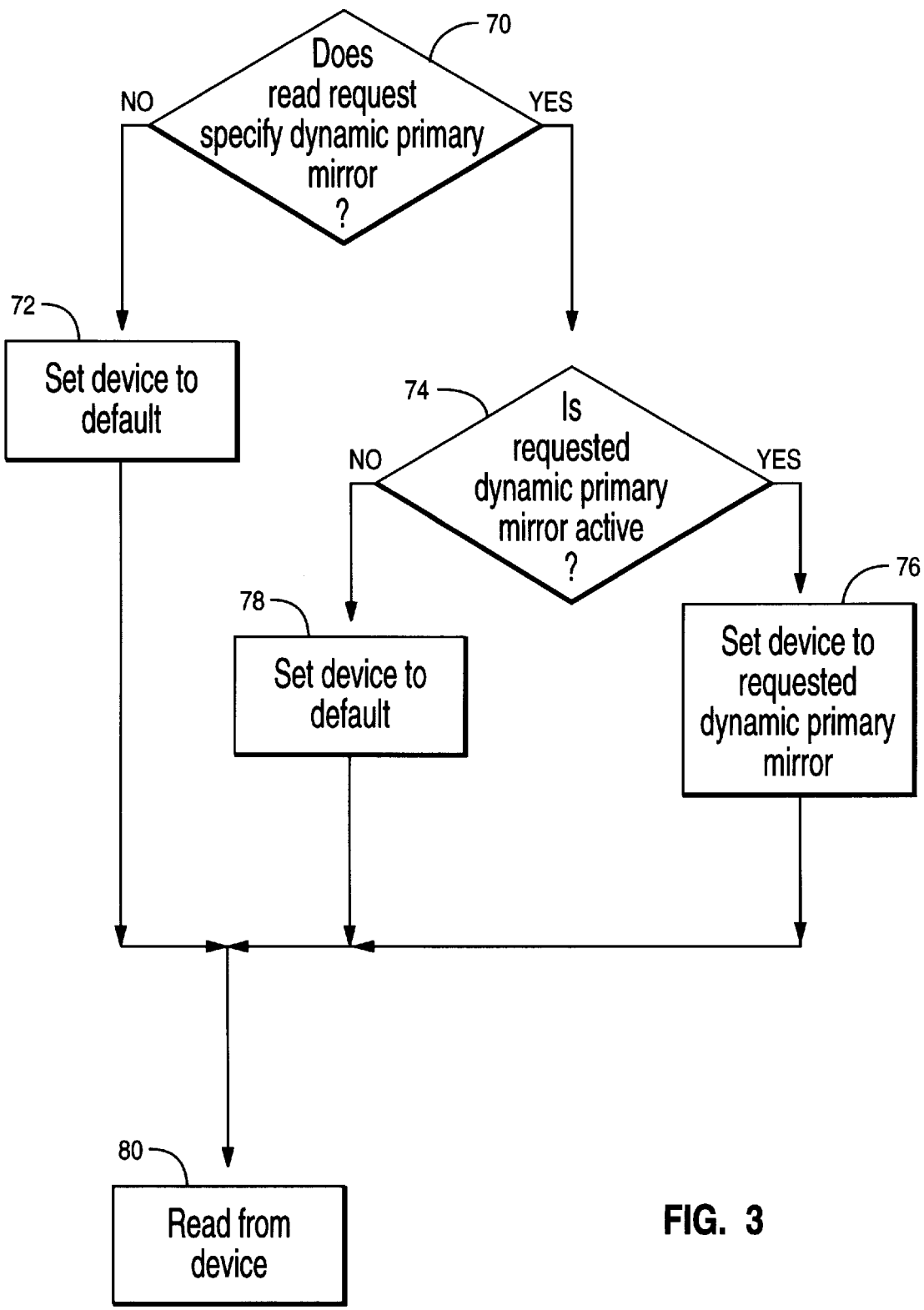
FIG. 3 is a flow chart depicting a method of dynamically specifying a primary mirror for a single read operation, according to the teachings of the present invention.

Referring now to FIG. 3, a method for dynamically specifying a primary mirror during a read operation will now be described. The first step is to determine if the read request specifies a dynamic primary mirror (step 70). As discussed above, the dynamic primary mirror may be specified in a variety of ways. If no dynamic primary mirror is requested, the default setting established when the logical volume was defined is used (step 72). The default setting may either specify a primary mirror, or may indicate that the mirror whose read head is closest to the desired data be used. If a dynamic primary mirror has been requested (i.e. the answer to the question in step 70 is "yes"), a check is made to determine if the requested dynamic primary mirror is active (step 74). If so, the device to be used for the read is set to the requested dynamic primary mirror (step 76). If not, the default setting established when the logical volume was defined is used (step 78). As discussed above, the default setting may either specify a primary mirror, or may indicate that the mirror whose read head is closest to the desired data should be used. The read request is then performed (step 80).

Figure 4:
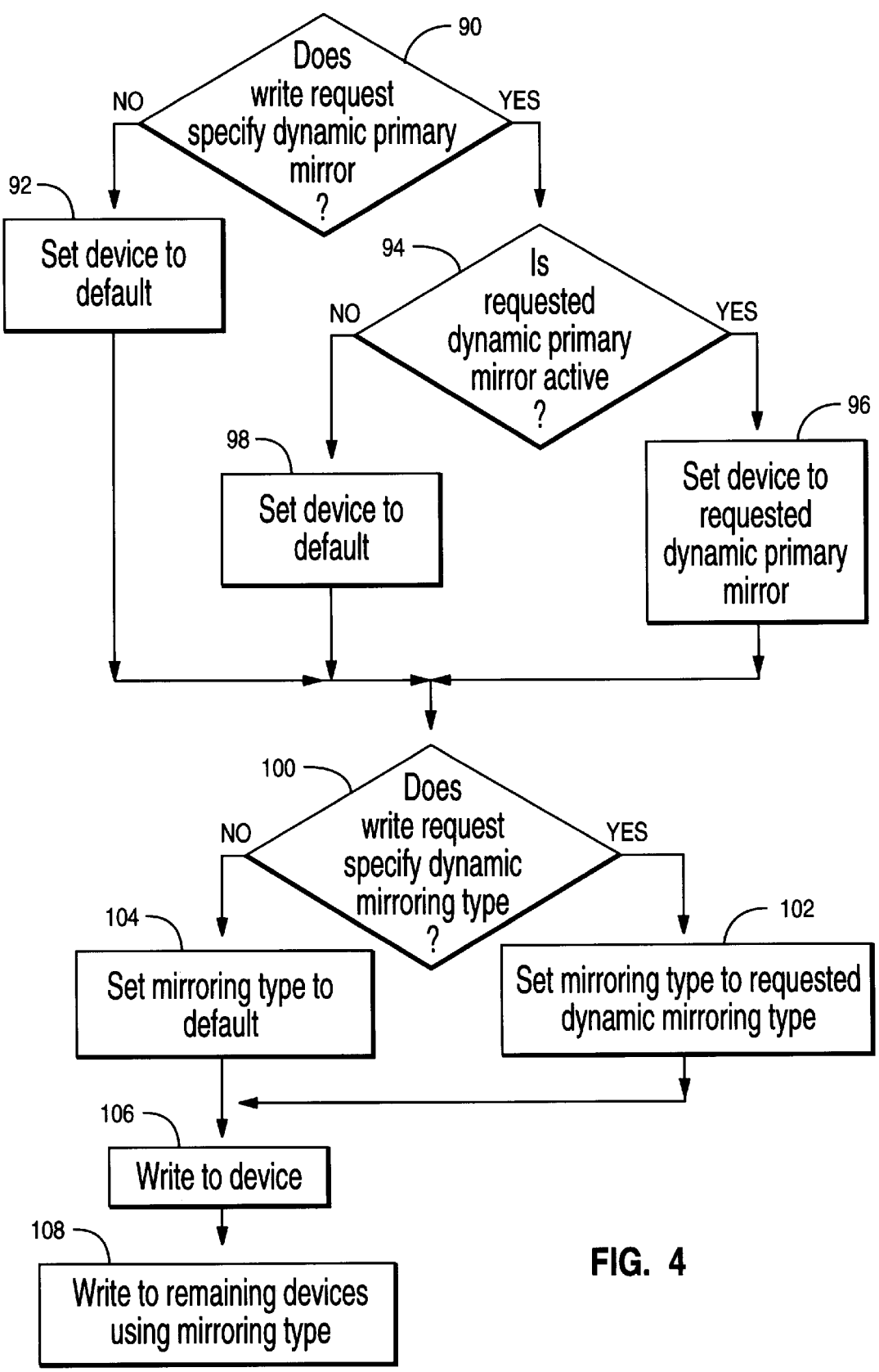
FIG. 4 is a flow chart depicting a method of dynamically specifying a primary mirror and scheduling type for a single write operation, according to the teachings of the present invention.

Referring now to FIG. 4, a method for dynamically specifying both a primary mirror and a scheduling policy for a write operation will now be described. The first step is to determine if the write request specifies a dynamic primary mirror (step 90). As discussed above, the dynamic primary mirror may be specified in a variety of ways. If no dynamic primary mirror is requested, the default setting established when the logical volume was defined is used (step 92). The default setting may either specify a primary mirror, or may indicate that the write request should be broadcast to all mirrors (i.e. parallel scheduling policy). If a dynamic primary mirror has been requested (i.e. the answer to the question in step 90 is "yes"), a check is made to determine if the requested dynamic primary mirror is active (step 94). If so, the device to be written to first is set to the requested dynamic primary mirror (step 96). If not, the default setting established when the logical volume was defined is used (step 98). As discussed above, the default setting may either specify a primary mirror, or may indicate that the write request should be broadcast to all mirrors (i.e. parallel scheduling policy).

Next, a check is made to determine if a dynamic mirroring type (i.e. either sequential or parallel) has been requested (step 100). If so, the mirroring type is set to the requested dynamic mirroring type (step 102). If not, the mirroring type established when the logical volume was defined is used (step 104). The write operation is then performed (step 106). If a primary mirror has been specified, either through a dynamic request or by default, that device is written to first. Finally, all remaining devices are written to according to the scheduling policy (step 108).

Allowing a primary mirror and scheduling policy to be dynamically specified for one I/O operation, or for a group of I/O operations, has several advantages. Disk and bus contention may be reduced, and overall system efficiency may increase. Further, in the event of a storage system failure, a particular disk may be dynamically selected to restore the system. Thus, a user may determine which disk is the most reliable and use that disk to load data necessary to restore the system or reload another system.

Although the invention has been described with a certain degree of particularity, it should be recognized that elements thereof may be altered by persons skilled in the art without departing from the spirit and scope of the invention. One of the preferred implementations of the invention is as sets of instructions resident in the memory 20 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for performing an I/O operation in a mirrored information handling system, comprising the steps of:

specifying a mirroring attribute;

if the specified mirroring attribute is available, performing the I/O operation according to the specified mirroring attribute; and if the specified mirroring attribute is not available, performing the I/O operation according to default mirroring attributes.

2. A method according to claim 1, further comprising the step of saving the specified mirroring attribute for use in one or more future I/O operations.

3. A method according to claim 1, wherein said step of specifying a mirroring attribute comprises the step of specifying a primary mirror.

4. A method according to claim 3, wherein said step of performing the I/O operation according to the specified mirroring attribute comprises the steps of:

writing data to the specified primary mirror; and after writing the data to the specified primary mirror, writing the data to one or more remaining mirrors.

5. A method according to claim 4, wherein said step of performing the I/O operation using default mirroring attributes comprises the step of writing the data to the remaining mirrors using a default scheduling policy.

6. A method according to claim 5, wherein the default scheduling policy is sequential write policy.

7. A method according to claim 5, wherein the default scheduling policy is a parallel write policy.

8. A method according to claim 3, wherein said step of performing the I/O operation according to the specified mirroring attribute comprises the step of reading data from the specified primary mirror.

9. A method according to claim 8, wherein said step of performing the I/O operation according to default mirroring attributes comprises the step of reading the data from a default mirror.

10. A method according to claim 1, wherein said step of specifying a mirroring attribute comprises the step of specifying a scheduling policy.

11. A method according to claim 10, wherein said step of performing the I/O operation using the specified mirroring attribute comprises the step of writing data to one or more mirrors according to a sequential write policy.

12. A method according to claim 10, wherein said step of performing the I/O operation using the specified mirroring attribute comprises the step of writing data to one or more mirrors according to a parallel write policy.

13. An information handling system, comprising:

an I/O subsystem, wherein said I/O subsystem includes a mirrored disk system;

means for specifying a mirroring attribute for an I/O operation;

means for performing the I/O operation according to the specified mirroring attribute; and means for performing the I/O operation according to default mirroring attributes.

14. An information handling system according to claim 13, further comprising means for saving the specified mirroring attribute for use in one or more future I/O operations.

15. An information handling system according to claim 13, wherein said means for specifying a mirroring attribute comprises means for specifying a primary mirror.

16. An information handling system according to claim 15, wherein said means for performing the I/O operation according to the specified mirroring attribute comprises means for writing data to the specified primary mirror before writing the data to one or more remaining mirrors.

17. An information handling system according to claim 16, wherein said means for performing the I/O operation using default mirroring attributes comprises means for writing the data to the remaining mirrors using a default scheduling policy.

18. An information handling system according to claim 15, wherein said means for performing the I/O operation according to the specified mirroring attribute comprises means for reading data from the specified primary mirror.

19. An information handling system according to claim 18, wherein said means for performing the I/O operation according to default mirroring attributes comprises means for reading the data from a default mirror.

20. An information handling system according to claim 13, wherein said means for specifying a mirroring attribute comprises means for specifying a scheduling policy.

21. An information handling system according to claim 20, wherein said means for performing the I/O operation using the specified mirroring attribute comprises means for writing data to one or more mirrors according to a sequential write policy.

22. An information handling system according to claim 20, wherein said means for performing the I/O operation using the specified mirroring attribute comprises means for writing data to one or more mirrors according to a parallel write policy.

23. A computer readable medium for controlling I/O operations in a mirrored information handling system, comprising:

means for specifying a mirroring attribute for an I/O operation;

means for performing the I/O operation according to the specified mirroring attribute; and means for performing the I/O operation according to default mirroring attributes.

24. A computer readable medium according to claim 23, further comprising means for saving the specified mirroring attribute for use in one or more future I/O operations.

25. A computer readable medium according to claim 23, wherein said means for specifying a mirroring attribute comprises means for specifying a primary mirror for the I/O operation.

26. A computer readable medium according to claim 25, wherein said means for performing the I/O operation according to the specified mirroring attribute comprises means for writing data to the specified primary mirror before writing the data to one or more remaining mirrors.

27. A computer readable medium according to claim 26, wherein said means for performing the I/O operation using default mirroring attributes comprises means for writing the data to the remaining mirrors using a default scheduling policy.

28. A computer readable medium according to claim 25, wherein said means for performing the I/O operation according to the specified mirroring attribute comprises means for reading data from the specified primary mirror.

29. A computer readable medium according to claim 28, wherein said means for performing the I/O operation according to default mirroring attributes comprises means for reading the data from a default mirror.

30. A computer readable medium according to claim 23, wherein said means for specifying a mirroring attribute comprises means for specifying a scheduling policy.

31. A computer readable medium according to claim 30, wherein said means for performing the I/O operation using the specified mirroring attribute comprises means for writing data to one or more mirrors according to a sequential write policy.

32. A computer readable medium according to claim 30, wherein said means for performing the I/O operation using the specified mirroring attribute comprises means for writing data to one or more mirrors according to a parallel write policy.

* * * * *